(12) United States Patent
Fang

(10) Patent No.: US 12,333,680 B2
(45) Date of Patent: Jun. 17, 2025

(54) IMAGE SPLICING METHOD AND APPARATUS, AND ELECTRONIC DEVICE AND COMPUTER-READABLE STORAGE MEDIUM

(71) Applicant: AXERA SEMICONDUCTOR (SHANGHAI) CO., LTD, Shanghai (CN)

(72) Inventor: Tianqi Fang, Shanghai (CN)

(73) Assignee: AXERA SEMICONDUCTOR (SHANGHAI) CO., LTD, Shanghai (CN)

( * ) Notice: Subject to any disclaimer, the term of this patent is extended or adjusted under 35 U.S.C. 154(b) by 180 days.

(21) Appl. No.: 18/042,883

(22) PCT Filed: Dec. 9, 2021

(86) PCT No.: PCT/CN2021/136711
§ 371 (c)(1),
(2) Date: Feb. 24, 2023

(87) PCT Pub. No.: WO2023/279655
PCT Pub. Date: Jan. 12, 2023

(65) Prior Publication Data
US 2023/0316476 A1  Oct. 5, 2023

(30) Foreign Application Priority Data
Jul. 9, 2021  (CN) .......................... 202110777851.7

(51) Int. Cl.
*G06T 5/50*  (2006.01)
(52) U.S. Cl.
CPC ...... *G06T 5/50* (2013.01); *G06T 2207/20021* (2013.01); *G06T 2207/20221* (2013.01)

(58) Field of Classification Search
CPC ............ G06T 5/50; G06T 2207/20021; G06T 2207/20221; G06T 2200/24; G06T 5/94; G06T 11/60; G06T 3/4038; G06T 5/90
See application file for complete search history.

(56) References Cited

U.S. PATENT DOCUMENTS

| 9,325,899 B1* | 4/2016 | Chou ....................... G06T 7/593 |
| 10,602,079 B2* | 3/2020 | Pincenti ................. H04N 23/45 |

(Continued)

FOREIGN PATENT DOCUMENTS

| CN | 109493281 A | 3/2019 |
| CN | 111080557 A | 4/2020 |

(Continued)

OTHER PUBLICATIONS

International Search Report dated Mar. 28, 2022, pertaining to Int'l Patent Application No. PCT/CN2021/136711, 13 pgs.

(Continued)

*Primary Examiner* — Jin Cheng Wang
(74) *Attorney, Agent, or Firm* — DINSMORE & SHOHL LLP

(57) ABSTRACT

An image splicing method and apparatus, and an electronic device and a computer-readable storage medium. The method includes: calculating, by using each pixel value of each first block in a first image to be spliced and each pixel value of each second block in a second image to be spliced, a block gain of each block in said first image (201); for each pixel point of said first image, calculating a pixel gain by using the block gain of each first block corresponding to the pixel point (202); calculating an output pixel value of each pixel point of said first image according to the pixel gain of each pixel point of said first image (203); and splicing said (Continued)

Calculating block gains of blocks in a first to-be-spliced image by using pixel values in first blocks in the first to-be-spliced image and pixel values of second blocks in a second to-be-spliced image — 201

For pixel points in pixel grids in the first to-be-spliced image, calculating pixel gains by using block gains of first blocks corresponding to the pixel points — 202

Calculating output pixel values of pixel points in pixel grids in the first to-be-spliced image according to the pixel gains of the pixel points in the pixel grids in the first to-be-spliced image — 203

Splicing the first to-be-spliced image with the second to-be-spliced image according to the output pixel values of the pixel points of the first to-be-spliced image to obtain a spliced image — 204 first image with said second image according to the output pixel value of each pixel point of said first image, so as to obtain a spliced image (204).

18 Claims, 3 Drawing Sheets

(56) References Cited

U.S. PATENT DOCUMENTS

| | | | |
|---|---|---|---|
| 11,361,488 B2* | 6/2022 | Zuo | G06T 5/50 |
| 2015/0154776 A1* | 6/2015 | Zhang | G06T 3/4038 |
| | | | 382/284 |
| 2017/0064203 A1* | 3/2017 | Kikuta | H04N 5/2624 |
| 2017/0337672 A1 | 11/2017 | Zou et al. | |
| 2019/0230295 A1* | 7/2019 | Pincenti | G06T 3/4038 |
| 2021/0291921 A1* | 9/2021 | White | B62K 21/005 |
| 2021/0366101 A1* | 11/2021 | George Boehm, Jr. | |
| | | | G06T 7/0004 |
| 2022/0138899 A1* | 5/2022 | Zhao | G06T 11/60 |
| | | | 382/159 |
| 2022/0138906 A1* | 5/2022 | Lin | G06T 5/50 |
| | | | 382/299 |
| 2022/0141395 A1* | 5/2022 | Sadalgi | H04N 23/632 |
| | | | 345/633 |
| 2023/0290120 A1* | 9/2023 | Zhao | G06N 3/04 |

FOREIGN PATENT DOCUMENTS

| | | |
|---|---|---|
| CN | 112233154 A | 1/2021 |
| CN | 112686802 A | 4/2021 |
| CN | 113487484 A | 10/2021 |

OTHER PUBLICATIONS

Notification to Grant Patent Rights for Invention pertaining to CN Patent Application No. 202110777851.7, 3 pgs.

* cited by examiner

| 1, 1 | 1, 2 | 1, 3 | 1, 4 | ... | 1, 15 | 1, 16 | 1, 17 |
|---|---|---|---|---|---|---|---|
| 2, 1 | 2, 2 | 2, 3 | 2, 4 | | 2, 15 | 2, 16 | 2, 17 |
| ... | ... | ... | ... | ... | | | ... |
| 19, 1 | 19, 2 | 19, 3 | 19, 4 | | 19, 15 | 19, 16 | 19, 17 |
| 20, 1 | 20, 2 | 20, 3 | 20, 4 | | 20, 15 | 20, 16 | 20, 17 |
| 21, 1 | 21, 2 | 21, 3 | 21, 4 | ... | 21, 15 | 21, 16 | 21, 17 |

IMAGE SPLICING METHOD AND APPARATUS, AND ELECTRONIC DEVICE AND COMPUTER-READABLE STORAGE MEDIUM

CROSS REFERENCE TO RELATED APPLICATIONS

The present application is a National Phase Entry of International Patent Application No. PCT/CN2021/136711 filed Dec. 9, 2021, which claims priority to Chinese Patent Application No. 202110777851.7 filed with China National Intellectual Property Administration on Jul. 9, 2021, and entitled "IMAGE SPLICING METHOD AND APPARATUS, ELECTRONIC DEVICE AND COMPUTER-READABLE STORAGE MEDIUM", which are hereby incorporated by reference in their entirety.

TECHNICAL FIELD

The present application relates to the technical field of image processing, and in particular to an image splicing method, an image splicing apparatus, an electronic device, and a computer-readable storage medium.

BACKGROUND

Image splicing can enable a plurality of images in the same scene to be spliced into a larger image, so that more information is presented in the same picture. However, the fact that the shooting devices of a plurality of images may be different, the shooting parameters may be different, the shooting angles may be different, and other factors result in a large difference between different images; the difference in contrast at the seams of the images obtained by direct splicing is large, resulting in a gap in the middle of the spliced large image.

SUMMARY

In view of this, embodiments of the present application provide an image splicing method, an image splicing apparatus, an electronic device, and a computer-readable storage medium, so that the problem that a gap exists on the spliced image can be solved.

Some embodiments of the present application provide an image splicing method, which may include steps of:
calculating block gains of blocks in a first to-be-spliced image by using pixel values in first blocks in the first to-be-spliced image and pixel values of second blocks in a second to-be-spliced image, wherein the first to-be-spliced image includes a plurality of first blocks, and the second to-be-spliced image includes a plurality of second blocks;
calculating, for pixel points in pixel grids in the first to-be-spliced image, pixel gains by using block gains of first blocks corresponding to the pixel points, wherein each pixel grid includes a plurality of pixel points;
calculating output pixel values of pixel points in pixel grids in the first to-be-spliced image according to the pixel gains of the pixel points in the pixel grids in the first to-be-spliced image; and
splicing the first to-be-spliced image with the second to-be-spliced image according to the output pixel values of the pixel points of the first to-be-spliced image to obtain a spliced image.

In an optional embodiment, the step of calculating output pixel values of pixel points in pixel grids in the first to-be-spliced image according to the pixel gains of the pixel points in the pixel grids in the first to-be-spliced image may include steps of:
calculating pixel weights corresponding to pixel points in pixel grids in the first to-be-spliced image; and
calculating and obtaining output pixel values of pixel points in the first to-be-spliced image according to the pixel gains and the pixel weights of the pixel points in the pixel grids in the first to-be-spliced image.

In the embodiment described above, pixel weights calculated in cooperation with the pixel gains can be calculated based on the requirements of pixel points, so that the output pixel values of the pixel points can better meet the splicing requirement.

In an optional embodiment, the step of calculating pixel weights corresponding to pixel points in pixel grids in the first to-be-spliced image may include a step of:
calculating, according to the sizes of pixel grids of the first to-be-spliced image, pixel weights corresponding to pixel points with coordinates of the pixel points in the pixel grids of the first to-be-spliced image in the corresponding pixel grids.

In the embodiment described above, when the pixel weights are determined, the size of the first to-be-spliced image and the coordinates of the pixel points are taken into consideration, so that the determined pixel weights can consider an influence on pixels around the pixel points; therefore, the finally determined output pixel values can better fuse the pixels around the pixel points.

In an optional embodiment, the step of calculating pixel gains by using block gains of first blocks corresponding to the pixel points may include steps of:
calculating and obtaining pixel gains including a designated number of pixel gain elements according to the pixel values of the pixel points and the designated number of block gains corresponding to the pixel points;
the step of calculating pixel weights corresponding to pixel points in pixel grids in the first to-be-spliced image may include a step of:
calculating, by using the size of the pixel grid according to the first to-be-spliced image and the coordinate of each pixel point in the pixel grid of the first to-be-spliced image, the pixel weight that includes the designated number of weight elements and corresponds to the respective pixel point.

In an optional embodiment, the designated number is four, the pixel weight includes four weight elements, and the step of calculating, by using the size of the pixel grids according to the first to-be-spliced image and the coordinate of each pixel point in the pixel grid of the first to-be-spliced image, the pixel weights that includes the designated number of weight elements and corresponds to the respective pixel point may include a step of:
calculating four weight elements in the pixel weights by using the following formulas:

$$\text{weight\_tl} = (h-0.5-i)*(w-0.5-j)/(w*h);$$

$$\text{weight\_tr} = (0.5+i)*(w-0.5-j)/(w*h);$$

$$\text{weight\_bl} = (h-0.5-i)*(0.5+j)/(w*h);$$

$$\text{weight\_br} = (0.5+i)*(0.5+j)/(w*h);$$

herein, weight_tl, weight_tr, weight_bl and weight_br represent four weight elements in a pixel weight of a to-be-calculated pixel point; i represents the abscissa of the to-be-calculated pixel point in a corresponding pixel grid; j represents the ordinate of the to-be-calculated pixel point in a corresponding pixel grid; w represents a width of a pixel grid corresponding to the to-be-calculated pixel point; and h represents a height of a pixel grid corresponding to the to-be-calculated pixel point.

In the embodiment described above, weights corresponding to the block gains are determined through the above calculation modes, and the obtained weight distributions of the pixel points at different positions are different, so that the final output pixel value can determine weights at different positions based on the splicing requirement.

In an optional embodiment, the step of calculating and obtaining pixel gains including a designated number of pixel gain elements according to the pixel values of the pixel points and the designated number of block gains corresponding to the pixel points may include a step of:

multiplying, for a target pixel point in a target pixel grid in the first to-be-spliced image, a target pixel value of the target pixel point by block gains of first blocks including the target pixel point to obtain a target pixel gain of the target pixel point, wherein the target pixel gain includes a designated number of pixel gain elements, and the designated number is a number of blocks including the target pixel grid.

In an optional embodiment, the step of calculating block gains of blocks in a first to-be-spliced image by using pixel values in first blocks in the first to-be-spliced image and pixel values of second blocks in a second to-be-spliced image may include steps of:

calculating, when a first target block is a block of an overlapping area of the first to-be-spliced image and the second to-be-spliced image, a total first pixel value of pixel points in the first target block;

calculating a total second pixel value of pixel points in a second block in the second to-be-spliced image corresponding to the first target block; and calculating and obtaining a block gain of the first target block according to the total first pixel value and the total second pixel value.

In the embodiment described above, for the block in the overlapping area, the pixels in the blocks in the second to-be-spliced image are combined when the block gains are calculated, so that the determined block gains and the output pixel values calculated based on the block gains can better fuse the second to-be-spliced image, and reduce the gap feeling of the spliced image.

In an optional embodiment, the step of calculating block gains of blocks in a first to-be-spliced image by using pixel values in first blocks in the first to-be-spliced image and pixel values of second blocks in a second to-be-spliced image may include steps of:

calculating, when a first designated block is a block of a partial overlapping area of the first to-be-spliced image and the second to-be-spliced image, a total first pixel value of pixel points in the first designated block;

calculating a total second pixel value of pixel points in a second block in the second to-be-spliced image corresponding to the first designated block;

calculating and obtaining an initial block gain of the first designated block according to the total first pixel value and the total second pixel value; and performing a weighted summation on the initial block gain and a designated numerical value to obtain a block gain of the first designated block.

Other embodiments of the present application provide an image splicing apparatus, which may include:

a first calculation module, configured to calculate block gains of blocks in a first to-be-spliced image by using pixel values in first blocks in the first to-be-spliced image and pixel values of second blocks in a second to-be-spliced image, wherein the first to-be-spliced image includes a plurality of first blocks, and the second to-be-spliced image includes a plurality of second blocks;

a second calculation module, configured to calculate, for pixel points in pixel grids in the first to-be-spliced image, pixel gains by using block gains of first blocks corresponding to the pixel points;

a third calculation module, configured to calculate output pixel values of pixel points in pixel grids in the first to-be-spliced image according to the pixel gains of the pixel points in the pixel grids in the first to-be-spliced image; and a splicing module, configured to splice the first to-be-spliced image with the second to-be-spliced image according to the output pixel values of the pixel points of the first to-be-spliced image to obtain a spliced image.

In an optional embodiment, the third calculation module may include a weight calculation unit and a pixel calculation unit, wherein the weight calculation unit is configured to calculate pixel weights corresponding to pixel points in pixel grids in the first to-be-spliced image;

the pixel calculation unit is configured to calculate and obtain output pixel values of pixel points in the first to-be-spliced image according to the pixel gains and the pixel weights of the pixel points in the pixel grids in the first to-be-spliced image.

In an optional embodiment, the weight calculation unit may be configured to calculate, according to the sizes of pixel grids of the first to-be-spliced image, pixel weights corresponding to pixel points with coordinates of the pixel points in the pixel grids of the first to-be-spliced image in the corresponding pixel grids.

In an optional embodiment, the second calculation module may be configured to calculate and obtain pixel gains including a designated number of pixel gain elements according to the pixel values of the pixel points and the designated number of block gains corresponding to the pixel points;

the weight calculation unit is configured to calculate, by using the size of the pixel grids according to the first to-be-spliced image and the coordinate of each pixel point in the pixel grid of the first to-be-spliced image, the pixel weight that includes the designated number of weight elements and corresponds to the respective pixel point.

In an optional embodiment, the second calculation module is configured to multiply, for a target pixel point in a target pixel grid in the first to-be-spliced image, a target pixel value of the target pixel point by block gains of first blocks including the target pixel point to obtain a target pixel gain of the target pixel point, wherein the target pixel gain includes a designated number of pixel gain elements, and the designated number is a number of blocks including the target pixel grid.

In an optional embodiment, the first calculation module may be configured to:

calculate, when a first target block is a block of an overlapping area of the first to-be-spliced image and the second to-be-spliced image, a total first pixel value of pixel points in the first target block;

calculate a total second pixel value of pixel points in a second block in the second to-be-spliced image corresponding to the first target block; and calculate and obtain a block gain of the first target block according to the total first pixel value and the total second pixel value.

In an optional embodiment, the first calculation module may be configured to:

calculate, when a first designated block is a block of a partial overlapping area of the first to-be-spliced image and the second to-be-spliced image, a total first pixel value of pixel points in the first designated block;

calculate a total second pixel value of pixel points in a second block in the second to-be-spliced image corresponding to the first designated block;

calculate and obtain an initial block gain of the first designated block according to the total first pixel value and the total second pixel value; and perform a weighted summation on the initial block gain and a designated numerical value to obtain a block gain of the first designated block.

Yet other embodiments of the present application provide an electronic device, which may include: a processor and a memory, wherein the memory has machine-readable instructions stored thereon and executable by the processor, wherein when the electronic device is running, the machine-readable instructions perform the steps of the image splicing method described above when executed by the processor.

Still other embodiments of the present application provide a computer-readable storage medium having a computer program stored thereon which, when executed by a processor, performs the steps of the image splicing method described above.

According to the image splicing method, the image splicing apparatus, the electronic device and the computer-readable storage medium provided in the embodiments of the present application, a calculation for gains from the pixel blocks to the pixel points are performed, so that the output pixel value of each pixel point of the first to-be-spliced image can be better fused with the pixel point of the second to-be-spliced image, therefor the spliced images can be better fused, and the gaps of the spliced images are reduced.

In order to make the aforementioned objects, features and advantages of the present application comprehensible, embodiments with reference to the attached drawing are described in detail below.

BRIEF DESCRIPTION OF THE DRAWINGS

In order to more clearly illustrate the technical solutions of the embodiments of the present application, the drawings required in the embodiments will be briefly described below. It should be understood that the following drawings only illustrate some embodiments of the present application and therefore should not be considered as limitations of the scope, and for those of ordinary skill in the art, other related drawings can be obtained according to these drawings without creative efforts.

DETAILED DESCRIPTION OF THE EMBODIMENTS

The technical solutions in embodiments of the present application will be described below with reference to the drawings in the embodiments of the present application.

It should be noted that similar reference numbers and letters refer to similar terms in the following drawings, and thus, once a term is defined in one drawing, it is unnecessary to be further defined or explained in subsequent drawings. Meanwhile, in the description of the present application, the terms "first", "second" and the like are used only for distinguishing the description, and may not be construed as indicating or implying the relative importance.

There are obvious gap problems in the images obtained by the current image splicing processing mainly due to different brightness of different images.

Based on this, the image splicing method, the image splicing apparatus, the electronic device and the computer-readable storage medium provided in the present application can balance the contrast by performing illumination compensation, so as to reduce the gap feeling of the spliced image.

Some embodiments of the present application will be described in detail below. For the convenience of understanding this embodiment, an electronic device that performs the image splicing method disclosed in the embodiment of the present application is described in detail firstly.

Figure 1:
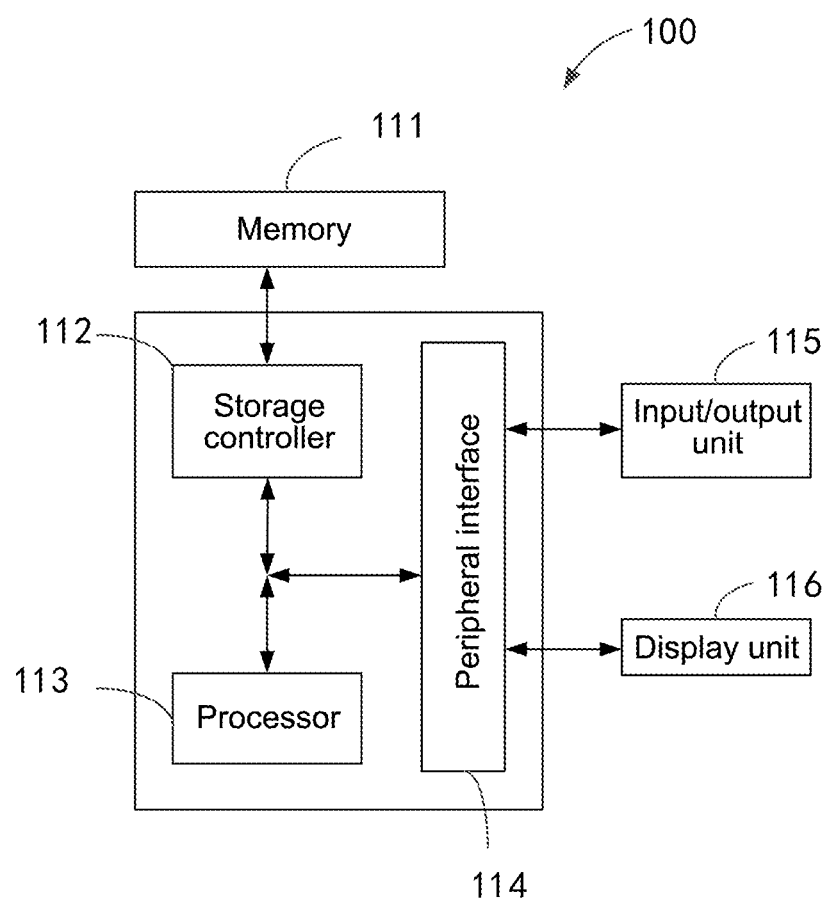
FIG. 1 is a block schematic diagram of an electronic device provided in an embodiment of the present application.

FIG. 1 shows a block schematic diagram of an electronic device. The electronic device 100 may include a memory 111, a storage controller 112, a processor 113, a peripheral interface 114, an input-output unit 115 and a display unit 116. It will be understood by those of ordinary skill in the art that the structure shown in FIG. 1 is merely illustrative and is not intended to limit the structure of the electronic device 100. For example, the electronic device 100 may further include more or fewer components than those shown in FIG. 1 or has a different configuration from that shown in FIG. 1.

The elements of the memory 111, the storage controller 112, the processor 113, the peripheral interface 114, the input/output unit 115 and the display unit 116 described above are electrically connected to each other directly or indirectly, so as to implement data transmission or interaction. For example, these elements can be electrically connected to each other via one or more communication buses or signal lines. The processor 113 described above is configured to execute the executable modules stored in the memory.

In the above, the memory 111 may be, but is not limited to, a Random Access Memory (RAM), a Read Only Memory (ROM), a Programmable Read-Only Memory (PROM), an Erasable Programmable Read-Only Memory (EPROM), an Electric Erasable Programmable Read-Only Memory (EEPROM), and the like. Herein, the memory 111 is configured to store a program, the processor 113 executes the program after receiving an execution instruction. The method performed by the electronic device 100 defined by the process disclosed in any embodiment of the present application may be applied to the processor 113, or implemented by the processor 113.

The processor 113 described above may be an integrated circuit chip having a signal processing capability. The processor 113 described above may be a general-purpose processor, including a Central Processing Unit (CPU), a Network Processor (NP) and the like, or may further be a digital signal processor (DSP), an Application Specific Integrated Circuit (ASIC), a Field Programmable Gate Array (FPGA) or other programmable logic devices, discrete gates or transistor logic devices and discrete hardware components. The various methods, steps and logic block diagrams disclosed in embodiments of the present application can be implemented or performed. The general-purpose processor may be a microprocessor, or the processor may be any conventional processor or the like.

The peripheral interface 114 described above couples various input/output apparatuses to the processor 113 and memory 111. In some embodiments, the peripheral interface 114, the processor 113 and the storage controller 112 may be implemented in a single chip. In other examples, the peripheral interface, the processor and the storage controller may be implemented by independent chips.

The input/output unit 115 described above is configured to provide input data to a user. The input/output unit 115 described above may be, but is not limited to, a mouse, a keyboard and the like.

The display unit 116 described above provides an interactive interface (e.g., a user interface) between the electronic device 100 and a user or is configured to display image data to the user for reference. In this embodiment, the display unit may be a liquid crystal display or a touch display. In the case of a touch display, the display unit may be a capacitive touch screen or a resistive touch screen and so on, which supports single-point and multi-point touch operations. Supporting single-point and multi-point touch operations means that the touch display can sense touch operations simultaneously generated from one or more positions on the touch display, and hand the sensed touch operations to the processor for calculation and processing.

The electronic device 100 in this embodiment may be configured to perform steps in the image splicing method provided in an embodiment of the present application. The implementation process of the image splicing method is described in detail below by several embodiments.

Figures 2, 3:
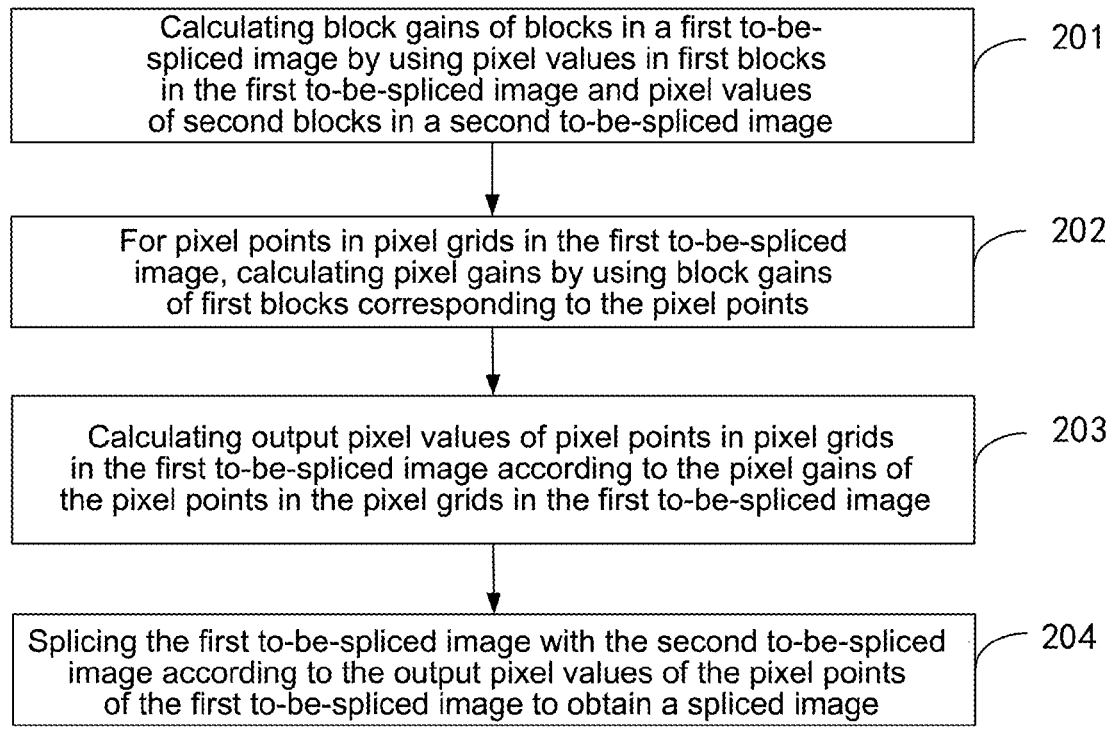
FIG. 2 is a flowchart of an image splicing method provided in an embodiment of the present application.
FIG. 3 is a schematic diagram of a first to-be-spliced image involved in the image splicing method provided in an embodiment of the present application.

Other embodiments of the present application will be described in detail below. Referring to FIG. 2, it is a flowchart of an image splicing method provided in an embodiment of the present application. The image splicing method in this embodiment may be applied to the electronic device. The specific process shown in FIG. 2 will be described in detail below.

Step 201, calculating block gains of blocks in a first to-be-spliced image by using pixel values in first blocks in the first to-be-spliced image and pixel values of second blocks in a second to-be-spliced image.

The first to-be-spliced image includes a plurality of first blocks, and the second to-be-spliced image includes a plurality of second blocks. Each first block may include a plurality of pixel grids, and each pixel grid may include a plurality of pixel points. Illustratively, the pixel grid may include 100 pixel points, 150 pixel points, 120 pixel points and the like. Illustratively, if the first to-be-spliced image has 30030×40080 pixel points and each pixel grid has a size of 30×40 pixel points, the first to-be-spliced image may be divided into 1001×1002 pixel grids.

Optionally, the number of the pixel points in each of the last column of the pixel grids and the last row of the pixel grids in the first to-be-spliced image may be less than the number of the pixel points in each of other columns of pixel grids and each of other rows of pixel grids. Illustratively, if the first to-be-spliced image has 30023×40025 pixel points and the size of each pixel grid is set to 30×40 pixel points, since 30023 cannot be divided by 30 and 40025 cannot be divided by 40, so that the number of pixel points in each of the last column of pixel grids and the last row of pixel grids can be less than the number of pixel points in each of other columns and each of other rows of pixel grids, and the first to-be-spliced image is divided into 1001×1001 pixel points.

In this embodiment, the sizes of the plurality of first blocks in the first to-be-spliced image are equal. For example, each block may be four pixel grids, nine pixel grids, six pixel grids and the like in size. Illustratively, the sizes of the plurality of second blocks in the second to-be-spliced image are the same as the sizes of the first blocks. For example, when the first block is four pixel grids in size, the second block may also be four pixel grids in size.

In one example, each first block may be four pixel grids in size and distributed in two rows and two columns, that is, each first block may include 2×2 pixel grids. The first to-be-spliced image including 17 columns and 21 rows of pixel grids is taken as an example, the 17 columns in the first to-be-spliced image may be divided into 16 different adjacent two columns, and the 21 rows in the first to-be-spliced image may be divided into 20 different adjacent two rows. Therefore, the first to-be-spliced image may determine 320 first blocks. Based on the blocks described above, the non-edge pixel grid of the first to-be-spliced image may be covered by four first blocks. Herein, the non-edge pixel grids represent pixel grids of non-first row, non-last row, non-first column and non-last column.

The example shown in FIG. 3 is taken as an example, wherein each first block may cover four pixel grids. Four pixel grids of pixel grid 1,1, pixel grids 1,2, pixel grid 2,1 and pixel grid 2,2 may be covered by one first block, four pixel grids of pixel grid 1,2, pixel grid 1,3, pixel grid 2,2 and pixel grid 2,3 may also be covered by one first block, and so on; a non-edge pixel grid can be covered by four first blocks, and an edge pixel grid can be covered by one or two first blocks.

Optionally, a first calculation mode may be adopted to calculate the block gain for an overlapping area of the first to-be-spliced image and the second to-be-spliced image, and a second calculation mode may be adopted to calculate the block gain for a non-overlapping area of the first to-be-spliced image and the second to-be-spliced image.

The first calculation mode described above may be a calculation mode of calculating by combining pixel values of the first to-be-spliced image and the second to-be-spliced image. When a first target block is a block of an overlapping area of the first to-be-spliced image and the second to-be-spliced image, a total first pixel value of pixel points in the first target block is calculated, a total second pixel value of pixel points in a second block in the second to-be-spliced image corresponding to the first target block is calculated, and the block gain of the first target block is calculated according to the total first pixel value and the total second pixel value.

Illustratively, the sum of the pixel values of all pixel points in the first target block may be calculated to obtain a total first pixel value, and the sum of the pixel values of all pixel points in the second block in the second to-be-spliced image overlapping with the first target block may be calculated to obtain a total second pixel value. The total first pixel value is divided by the total second pixel value to obtain the block gain of the first target block.

A designated numerical value may be taken in the second calculation mode described above. In one example, the block gain for a first block in the first to-be-spliced image not overlapping with the second to-be-spliced image may be 1.

Optionally, for the partially overlapped first block, the block gain may be calculated by adopting a third calculation mode.

Illustratively, a total first pixel value of pixel points in the first designated block is calculated, a total second pixel value of pixel points in a second block in the second to-be-spliced image corresponding to the first designated block is calculated, a first block gain of the first designated block is calculated according to the total first pixel value and the second total pixel value, and a weighted summation is performed on the first block gain and a designated numerical value to obtain the block gain of the first designated block.

Optionally, the step of performing a weighted summation on the first block gain and a designated numerical value to obtain the block gain of the first designated block described above may include: determining the weight of the first block gain according to the overlapping proportion of the first designated block and the second to-be-spliced image; and performing a weighted summation on the first block gain and a designated numerical value according to the weight of the first block gain to obtain the block gain of the first designated block.

Illustratively, the sum of the weight of the first block gain and the weight of the designated numerical value is one.

Illustratively, according to the overlapping proportion of the first designated block and the second to-be-spliced image being 70%, the weight of the first block gain may be 70%, and the weight of the designated numerical value may be 30%.

Illustratively, the third calculation mode described above may be represented by the following formula:

$$Gain_p = a*Gain_{p1} + b*Sv;$$

herein, $Gain_p$ represents the block gain of a to-be-calculated block; $Gain_{p1}$ represents the first block gain of the to-be-calculated block; Sv represents a designated numerical value; a represents the weight of the first block gain of the to-be-calculated block; b represents the weight of the designated numerical value.

Optionally, a+b=1; Sv=1.

In step 202, for pixel points in pixel grids in the first to-be-spliced image, pixel gains is calculated using block gains of first blocks corresponding to the pixel points.

Optionally, for a target pixel point in a target pixel grid in the first to-be-spliced image, a target pixel value of the target pixel point is multiplied by block gains of first blocks including the target pixel point to obtain a target pixel gain of the target pixel point.

The target pixel gain may include a designated number of pixel gain elements, wherein the designated number is the number of blocks including the target pixel grid.

For example, each first block includes four pixel grids, wherein if the target pixel grid is a pixel grid of a non-first row, a non-first column, a non-last row or a non-last column, the target pixel grid can be covered by four first blocks. The example shown in FIG. 3 is taken as an example, the pixel grid 2,2 of the second column and the second row can be covered by four first blocks of a first block (1,1, 1,2, 2,1, 2,2), a first block (1,2, 1,3, 2,2, 2,3), a first block (2,1, 2,2, 3,1, 3,2) and a first block (2,2, 2,3, 3,2, 3,3). The pixel points in the pixel grid 22 can be calculated according to the block gains of the four first blocks of the first block (1,1, 1,2, 2,1, 2,2), the first block (1,2, 1,3, 2,2, 2,3), the first block (2,1, 2,2, 3,1, 3,2) and the first block (2,2, 2,3, 3,2, 3,3) to obtain four pixel gain elements.

The first pixel point in any non-edge pixel grid is taken as an example, the calculation formulas of the pixel gain of the first pixel point can be represented as:

$$p\_gain\_tl1 = Pv1 * gain\_tl1;$$

$$p\_gain\_bl1 = Pv1 * gain\_bl1;$$

$$p\_gain\_tr1 = Pv1 * gain\_tr1;\ and$$

$$p\_gain\_br1 = Pv1 * gain\_br1;$$

herein, gain_tl1 represents a first block gain of the first pixel point; gain_bl1 represents a second block gain of the first pixel point; gain_tr1 represents a third block gain of the first pixel point; gain_br1 represents a fourth block gain of the first pixel point; p_gain_tl1 represents a first pixel gain element of the first pixel point; p_gain_bl1 represents a second pixel gain element of the first pixel point; p_gain_tr1 represents a third pixel gain element of the first pixel point; p_gain_br1 represents a fourth pixel gain element of the first pixel point; and Pv1 represents the pixel value of the first pixel point.

The example shown in FIG. 3 is taken as an example, gain_tl1 may represent the block gain of the first block covering the upper left of the first pixel point; gain_bl1 may represent the block gain of the first block covering the lower left of the first pixel point; gain_tr1 may represent the block gain of the first block covering the upper right of the first pixel point; and gain_br1 may represent the block gain of the first block covering the upper right of the first pixel point.

A second pixel point in any edge pixel grid that is a non-corner pixel grid is taken as an example, the calculation formulas of the pixel gain of the second pixel point can be represented as:

$$p\_gain1 = Pv2 * gain\_1;\ and$$

$$p\_gain2 = Pv2 * gain\_2;$$

herein, gain_1 represents the first block gain of the second pixel point; gain_2 represents the second block gain of the second pixel point; p_gain_1 represents a first pixel gain element of a second pixel point; p_gain_2 represents a second pixel gain element of the second pixel point; and Pv2 represents the pixel value of the second pixel point.

A third pixel point in any corner pixel grid is taken as an example, the calculation formula of the pixel gain of the third pixel point can be represented as:

$$p\_gain = Pv3 * gain;$$

herein, gain represents the block gain covering a third pixel point; p_gain represents the pixel gain of the third pixel point; and Pv3 represents the pixel value of the third pixel point.

In step 203, output pixel values of pixel points in pixel grids in the first to-be-spliced image is calculated according to the pixel gains of the pixel points in the pixel grids in the first to-be-spliced image.

Optionally, if the pixel gain corresponding to a pixel point includes a plurality of pixel gain elements, a weighted summation may be performed on the plurality of pixel gain elements to obtain an output pixel value of the pixel point.

Illustratively, step 203 may include step 2031 and step 2032.

In step 2031, pixel weights corresponding to pixel points in pixel grids in the first to-be-spliced image are calculated.

Optionally, according to the sizes of pixel grids of the first to-be-spliced image, pixel weights corresponding to pixel points may be calculated with coordinates of the pixel points in the pixel grids of the first to-be-spliced image in corresponding pixel grids.

In this embodiment, the number of elements included in the pixel weight corresponding to each pixel point may be the same as the number of elements included in the pixel gain corresponding to the pixel point.

Illustratively, step 2031 may include: calculating, by using the size of the pixel grid according to the first to-be-spliced image and the coordinate of each pixel points in the pixel grid of the first to-be-spliced image, the pixel weight that includes the designated number of weight elements and corresponds to the respective pixel point.

In this embodiment, the first to-be-spliced image as a left image and the second to-be-spliced image as a right image are taken as an example to describe the calculation of the weight.

For example, the designated number is taken as four, so that the pixel weight may include four weight elements, and for the pixel weight including the designated number of weight elements, the four weight elements in the pixel weight may be calculated by using the following formulas:

$$\text{weight\_tl}=(h-0.5-i)*(w-0.5-j)/(w*h);$$

$$\text{weight\_tr}=(0.5+i)*(w-0.5-j)/(w*h);$$

$$\text{weight\_bl}=(h-0.5-i)*(0.5+j)/(w*h);$$

$$\text{weight\_br}=(0.5+i)*(0.5+j)/(w*h);$$

herein, weight_tl, weight_tr, weight_bl and weight_br represent four weight elements in a pixel weight of a to-be-calculated pixel point respectively; i represents the abscissa of the to-be-calculated pixel point in a corresponding pixel grid; j represents the ordinate of the to-be-calculated pixel point in a corresponding pixel grid; w represents a width of a pixel grid corresponding to the to-be-calculated pixel point; and h represents a height of a pixel grid corresponding to the to-be-calculated pixel point.

The example shown in FIG. 3 is taken as an example, weight_tl may represent the pixel weight of the block gain of the first block covering the upper left of the to-be-calculated pixel point; the gain_bl may represent the pixel weight of the block gain of the first block covering the lower left of the to-be-calculated pixel point; gain_tr may represent the pixel weight of the block gain of the first block covering the upper right of the to-be-calculated pixel point; and gain_br may represent the pixel weight of the block gain of the first block covering the upper right of the to-be-calculated pixel point.

In the weight calculation formula described above, the smaller the i, j of the pixel point is, the larger the influence of the block gain of the first block in upper left on the pixel point is, and the larger the i, j is, the larger the influence of the block gain of the first block in lower right on the pixel point is, so that the pixel point closer to the second to-be-spliced image is greatly influenced by the block gain of the first block close to the second to-be-spliced image, and the first to-be-spliced image can be better fused with the second to-be-spliced image; the pixel points far away from the second to-be-spliced image are less influenced by the block gain of the first block close to the second to-be-spliced image, and the original image brightness of the first to-be-spliced image can be better kept.

In this embodiment, the weight calculation formula described above is a calculation formula based on left and right spliced images. In actual requirements, if the images need to be spliced up and down, the weight calculation formula described above may be adaptively adjusted to adjust the influence of the block gains of the blocks at different positions on the pixel point.

In one example, the coordinate in each pixel grid may take a pixel point at the upper left corner in the pixel grid as a coordinate (1,1), with an extension from the upper left corner to the right as a positive abscissa, and an extension from the upper left corner to the bottom as a positive ordinate. A pixel grid including 30×40 pixel points is taken as an example, the value range of the abscissa of the pixel point in the pixel grid is less than forty and greater than or equal to one; the value range of the ordinate is less than thirty and greater than or equal to one.

In step 2032, output pixel values of pixel points in the first to-be-spliced image are calculated and obtained according to the pixel gains and the pixel weights of the pixel points in the pixel grids in the first to-be-spliced image.

For example, the designated number is taken as four, the calculation mode of the output pixel value of the to-be-calculated pixel point can be represented as:

$$\text{pixel\_out}=\text{p\_gain\_tl}*\text{weight\_tl}+\text{p\_gain\_tr}*\text{weight\_tr}+\text{p\_gain\_bl}*\text{weight\_bl}+\text{p\_gain\_br}*\text{weight\_br};$$

herein, pixel_out represents the output pixel value of the to-be-calculated pixel point; p_gain_tl represents a first pixel gain element of the to-be-calculated pixel point; p_gain_bl represents a second pixel gain element of the to-be-calculated pixel point; p_gain_tr represents a third pixel gain element of the to-be-calculated pixel point; and p_gain_br represents a fourth pixel gain element of the to-be-calculated pixel point.

The embodiment in which the position relationship between first blocks and pixel grids is as shown in FIG. 3 is taken as an example, wherein the first pixel gain element is a pixel gain obtained by multiplying the pixel value by the block gain of the block at the upper left of the pixel grid; the second pixel gain element is a pixel gain obtained by multiplying the pixel value by the block gain of the block at the lower left of the pixel grid; the third pixel gain element is a pixel gain obtained by multiplying the pixel value by the block gain of the block at the upper right of the pixel grid; and the fourth pixel gain element is a pixel gain obtained by multiplying the pixel value by the block gain of the block at the lower right of the pixel grid.

Optionally, if a pixel grid is an edge pixel grid and is not a corner pixel grid, the pixel grid is covered by two first blocks, and the calculation formulas for the output pixel values of the pixel points in the pixel grid may be the following formulas.

If a pixel grid is a pixel grid in the last row, the calculation formula for the output pixel value can be represented as:

$$\text{pixel\_out}=\text{p\_gain\_tl}*\text{weight\_tl}+\text{p\_gain\_tr}*\text{weight\_tr}+\text{p\_gain\_bl'}*\text{weight\_bl}+\text{p\_gain\_br'}*\text{weight\_br};$$

herein, p_gain_bl' represents the block gain of the first block closest to the position of the first block p_gain_bl of the pixel point in theory, for example, p_gain_bl' may be equal to p_gain_tl; and p_gain_br' represents the block gain of the first block closest to the position of the first block p_gain_br of the pixel point in theory, for example, p_gain_br' is equal to p_gain_tr.

If a pixel grid is a pixel grid in the first row, the calculation formula for the output pixel value can be represented as:

pixel_out=p_gain_bl*weight_bl+
p_gain_br*weight_br+p_gain_tl'*weight_tl+
p_gain_tr'*weight_tr;

herein, p_gain_tl' represents the block gain of the first block closest to the position of the first block corresponding to p_gain_tl of the pixel point in theory, for example, p_gain_bl' may be equal to p_gain_tl; and p_gain_tr' represents the block gain of the first block closest to the position of the first block corresponding to p_gain_tr of the pixel point in theory, for example, p_gain_tr' is equal to p_gain_br.

If a pixel grid is a pixel grid in the last column, the calculation formula for the output pixel value can be represented as:

pixel_out=p_gain_tl*weight_tl+
p_gain_bl*weight_bl+p_gain_tr'*weight_tr+
p_gain_br'*weight_br;

herein, p_gain_tr' represents the block gain of the first block closest to the position of the first block corresponding to p_gain_tr of the pixel point in theory, for example, p_gain_tr' may be equal to p_gain_tl; and p_gain_br' represents the block gain of the first block closest to the position of the first block corresponding to p_gain_br of the pixel point in theory, for example, p_gain_br' is equal to p_gain_bl;

and if a pixel grid is a pixel grid in the first column, the calculation formula for the output pixel value can be represented as:

pixel_out=p_gain_tr*weight_tr+
p_gain_br*weight_br+p_gain_tl'*weight_tl+
p_gain_bl'*weight_bl;

herein, p_gain_tl' represents the block gain of the first block closest to the position of the first block corresponding to p_gain_tl of the pixel point in theory, for example, p_gain_tl' may be equal to p_gain_tr; and p_gain_bl' represents the block gain of the first block closest to the position of the first block corresponding to p_gain_bl of the pixel point in theory, for example, p_gain_bl' is equal to p_gain_br.

Optionally, if the pixel gain corresponding to a pixel point only includes one pixel gain element, the pixel gain element may be used as the output pixel value of the pixel point.

Optionally, if the pixel gain corresponding to a pixel point only includes one pixel gain element, a product of the pixel gain element and a set numerical value may be used as the output pixel value of the pixel point. The set numerical value may be calculated based on the coordinate of the pixel grid in which the pixel point is located.

For example, if the pixel gain corresponding to a pixel point only includes one pixel gain element, the calculation formula for the output pixel value may be shown as follows:

pixel_out=p_gain_tl*weight_tl+p_gain_tr*weight_tr+
p_gain_bl'*weight_bl+p_gain_br'*weight_br;

herein, the p_gain_tr', p_gain_bl' and p_gain_br' described above may be equal to p_gain_tl;
or, pixel_out=p_gain_tl'*weight_tl+p_gain_tr*weight_tr+
p_gain_bl'*weight_bl+p_gain_br'*weight_br;

herein, the p_gain_tl', p_gain_bl' and p_gain_br' described above may be equal to p_gain_tr.
Or, pixel_out=p_gain_tl'*weight_tl+
p_gain_tr'*weight_tr+p_gain_bl*weight_bl+
p_gain_br'*weight_br;

herein, the p_gain_tl', p_gain_tr' and p_gain_br' described above may be equal to p_gain_bl.
Or, pixel_out=p_gain_tl'*weight_tl+
p_gain_tr'*weight_tr+p_gain_bl'*weight_bl+
p_gain_br*weight_br;

herein, the p_gain_tl', p_gain_tr' and p_gain_bl' described above may be equal to p_gain_br.

In step 204, the first to-be-spliced image is spliced with the second to-be-spliced image according to the output pixel values of the pixel points of the first to-be-spliced image to obtain a spliced image.

According to the image splicing method provided in the embodiment of the present application, a calculation for the gains from the pixel blocks to the pixel points are performed, so that the output pixel value of each pixel point of the first to-be-spliced image can be better fused with the pixel point of the second to-be-spliced image, therefore the spliced images can be better fused, and the gaps of the spliced images are reduced.

Yet other embodiments of the present application will be described in detail below. Based on the same application concept, an embodiment of the present application further provides an image splicing apparatus corresponding to the image splicing method, and since the principle of solving the problem of the apparatus in the embodiment of the present application is similar to that in the embodiment of the aforementioned image splicing method, the implementation of the apparatus in the embodiment of the present application may refer to the description in the embodiment of the method described above, and the repeated parts are not described again.

Figure 4:
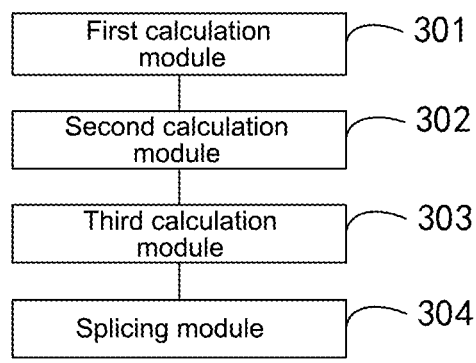
FIG. 4 is a schematic diagram of the functional modules of an image splicing apparatus provided in an embodiment of the present application.

Referring to FIG. 4, it is a schematic diagram of the functional modules of an image splicing apparatus provided in an embodiment of the present application. The modules in the image splicing apparatus in this embodiment are configured to perform steps in the method embodiment described above. The image splicing apparatus may include: a first calculation module 301, a second calculation module 302, a third calculation module 303 and a splicing module 304, wherein the functions of the modules are as follows.

The first calculation module 301 may be configured to calculate block gains of blocks in a first to-be-spliced image by using pixel values in first blocks in the first to-be-spliced image and pixel values of second blocks in a second to-be-spliced image, wherein the first to-be-spliced image includes a plurality of first blocks, and the second to-be-spliced image includes a plurality of second blocks;

the second calculation module 302 may be configured to calculate, for pixel points in pixel grids in the first to-be-spliced image, pixel gains by using block gains of first blocks corresponding to the pixel points;

the third calculation module 303 may be configured to calculate output pixel values of pixel points in pixel grids in the first to-be-spliced image according to the pixel gains of the pixel points in the pixel grids in the first to-be-spliced image; and the splicing module 304 may be configured to splice the first to-be-spliced image with the second to-be-spliced image according to the output pixel values of the pixel points of the first to-be-spliced image to obtain a spliced image.

In a possible embodiment, the third calculation module 303 may include: a weight calculation unit and a pixel calculation unit, wherein the weight calculation unit may be configured to calculate pixel weights corresponding to pixel points in pixel grids in the first to-be-spliced image;

the pixel calculation unit may be configured to calculate and obtain output pixel values of pixel points in the first to-be-spliced image according to the pixel gains and the pixel weights of the pixel points in the pixel grids in the first to-be-spliced image.

In a possible embodiment, the weight calculation unit may be configured to:

calculate, according to the sizes of pixel grids of the first to-be-spliced image, pixel weights corresponding to pixel points with coordinates of the pixel points in the pixel grids of the first to-be-spliced image in the corresponding pixel grids.

In a possible embodiment, the second calculation module 302 may be configured to calculate and obtain pixel gains including a designated number of pixel gain elements according to the pixel values of the pixel points and the designated number of block gains corresponding to the pixel points;

the weight calculation unit is configured to calculate, by using the size of the pixel grid according to the first to-be-spliced image and the coordinate of each pixel point in the pixel grid of the first to-be-spliced image, the pixel weight that includes the designated number of weight elements and corresponds to the respective pixel point.

In a possible embodiment, the designated number is four, the pixel weight includes four weight elements, and the weight calculation unit is configured to:

calculate four weight elements in the pixel weight by using the following formulas:

$$\text{weight\_tl}=(h-0.5-i)*(w-0.5-j)/(w*h);$$

$$\text{weight\_tr}=(0.5+i)*(w-0.5-j)/(w*h);$$

$$\text{weight\_bl}=(h-0.5-i)*(0.5+j)/(w*h);$$

$$\text{weight\_br}=(0.5+i)*(0.5+j)/(w*h);$$

herein, weight_tl, weight_tr, weight_bl and weight_br represent four weight elements in a pixel weight of a to-be-calculated pixel point; i represents the abscissa of the to-be-calculated pixel point in a corresponding pixel grid; j represents the ordinate of the to-be-calculated pixel point in a corresponding pixel grid; w represents a width of a pixel grid corresponding to the to-be-calculated pixel point; and h represents a height of a pixel grid corresponding to the to-be-calculated pixel point.

In a possible embodiment, the second calculation module 302 may be configured to:

multiplying, for a target pixel point in a target pixel grid in the first to-be-spliced image, a target pixel value of the target pixel point by block gains of first blocks including the target pixel point to obtain a target pixel gain of the target pixel point, wherein the target pixel gain includes a designated number of pixel gain elements, and the designated number is a number of blocks including the target pixel grid.

In a possible embodiment, the first calculation module 301 may be configured to:

calculating, when a first target block is a block of an overlapping area of the first to-be-spliced image and the second to-be-spliced image, a total first pixel value of pixel points in the first target block;

calculate a total second pixel value of pixel points in a second block in the second to-be-spliced image corresponding to the first target block; and calculate and obtain a block gain of the first target block according to the total first pixel value and the total second pixel value.

In a possible embodiment, the first calculation module 301 may be configured to:

calculate, when a first designated block is a block of a partial overlapping area of the first to-be-spliced image and the second to-be-spliced image, a total first pixel value of pixel points in the first designated block;

calculate a total second pixel value of pixel points in a second block in the second to-be-spliced image corresponding to the first designated block;

calculate and obtain an initial block gain of the first designated block according to the total first pixel value and the total second pixel value; and perform a weighted summation on the initial block gain and a designated numerical value to obtain a block gain of the first designated block.

In addition, an embodiment of the present application further provides a computer-readable storage medium having a computer program stored thereon which, when executed by a processor, performs the steps of the image splicing method in the method embodiment described above.

A computer program product of the image splicing method provided in the embodiment of the present application includes a computer-readable storage medium storing a program code, wherein instructions included in the program code may be configured to perform the steps of the image splicing method in the method embodiment described above, which may be specifically referred to the method embodiment described above, and is not described herein again.

In the several embodiments provided in the present application, it should be understood that the disclosed apparatus and method can also be implemented in other manners. The apparatus embodiments described above are merely illustrative. For example, flowcharts and block diagrams in the drawings show systematic architectures, functions, and operations of the apparatus, the method and the computer program product possibly implemented according to a plurality of embodiments of the present application. In this regard, each block in the flowcharts or the block diagrams can represent a portion of a module, a program segment or code, wherein the portion of the module, the program segment or the code includes one or more executable instructions for implementing specified logical functions. It should also be noted that, in some alternative implementations, the functions shown in the blocks may occur in an order different from the order shown in the drawings. For example, two consecutive blocks may, in fact, be executed substantially in parallel, and the two blocks may sometimes be executed in a reverse order, depending upon the functions involved. It should also be noted that each block of the block diagrams and/or the flowcharts and a combination of the blocks in the block diagrams and/or the flowcharts can be implemented through a dedicated hardware-based system that executes a specified function or operation, or can be implemented through a combination of a dedicated hardware and a computer instruction.

In addition, the functional modules in the embodiments of the present application can be integrated together to form an independent part, or each module can exist independently, or two or more modules can be integrated to form an independent part.

The function, if implemented in a form of a software functional module and sold or used as an independent product, can be stored in a computer-readable storage medium. Based on such understanding, the essential of, or a part contributing to the related art of, or parts of the technical solution can be embodied in a form of a software product. The computer software product is stored in a storage medium and includes several instructions for enabling a computer device (which can be a personal computer, a server, a network device, or the like) to implement all or part of the steps of the method described in the embodiments of the present application. The aforementioned storage medium includes a U-disk, a removable hard disk, a read-only memory (ROM), a random access memory (RAM), a magnetic disk, an optical disk, or other mediums capable of storing program code. It is noted that, in the present invention, relational terms such as "first" and "second" are merely used to distinguish one entity or operation from another entity or operation without necessarily requiring or implying any actual relationship or order between such entities or operations. Furthermore, the terms "include", "including", or any other variation thereof, are intended to encompass a non-exclusive inclusion, such that a process, method, article, or device that includes a series of elements not only include those elements but also include other elements not explicitly listed or inherent to such process, method, article, or device. An element defined by the phrase "including . . . " does not preclude, without more constraints, the existence of additional identical elements in the process, method, article, or device that includes the element.

The above described contents are only preferred embodiments of the present application and are not intended to limit the present application. For those skilled in the art, the present application can be modified and varied. Any modification, equivalent, improvement and the like made within the spirit and principle of the present application shall fall within the protection scope of the present application. It should be further noted that similar reference numbers and letters refer to similar terms in the following drawings, and thus, once a term is defined in one drawing, it is unnecessary to be further defined or explained in subsequent drawings.

What is mentioned above is only specific embodiments of the present application, but the protection scope of the present application is not limited thereto, and any person skilled in the art can easily conceive changes or substitutions within the technical scope disclosed in the present application, and these changes and substitutions shall fall within the protection scope of the present application. Therefore, the protection scope of the present application shall be subject to the protection scope of the claims.

INDUSTRIAL APPLICABILITY

The present application provides an image splicing method, an image splicing apparatus, an electronic device, and a computer-readable storage medium, wherein the method includes: calculating block gains of blocks in a first to-be-spliced image by using pixel values in first blocks in the first to-be-spliced image and pixel values of second blocks in a second to-be-spliced image, wherein the first to-be-spliced image includes a plurality of first blocks, and the second to-be-spliced image includes a plurality of second blocks; calculating, for pixel points in the first to-be-spliced image, pixel gains by using block gains of first blocks corresponding to the pixel points; calculating output pixel values of pixel points of the first to-be-spliced image according to the pixel gains of the pixel points in the first to-be-spliced image; and splicing the first to-be-spliced image with the second to-be-spliced image according to the output pixel values of the pixel points of the first to-be-spliced image to obtain a spliced image.

In addition, it should be understood that the image splicing method, the image splicing apparatus, the electronic device and the computer-readable storage medium of the present application are reproducible and can be used in a variety of industrial applications. For example, the image splicing method, the image splicing apparatus, the electronic device and the computer-readable storage medium of the present application can be used in the technical field where image processing is required.

The invention claimed is:

1. An image splicing method, comprising steps of:
calculating block gains of blocks in a first to-be-spliced image by using pixel values in first blocks in the first to-be-spliced image and pixel values of second blocks in a second to-be-spliced image, wherein the first to-be-spliced image comprises a plurality of the first blocks, and the second to-be-spliced image comprises a plurality of the second blocks;
calculating, for pixel points in pixel grids in the first to-be-spliced image, pixel gains by using block gains of the first blocks corresponding to the pixel points, wherein each pixel grid comprises a plurality of the pixel points;
calculating output pixel values of the pixel points in the pixel grids in the first to-be-spliced image according to the pixel gains of the pixel points in the pixel grids in the first to-be-spliced image; and
splicing the first to-be-spliced image with the second to-be-spliced image according to the output pixel values of the pixel points of the first to-be-spliced image to obtain a spliced image;
wherein the step of calculating block gains of blocks in a first to-be-spliced image by using pixel values in first blocks in the first to-be-spliced image and pixel values of second blocks in a second to-be-spliced image comprises steps of:
calculating, when a first target block is a block of an overlapping area of the first to-be-spliced image and the second to-be-spliced image, a total first pixel value of the pixel points in the first target block;
calculating a total second pixel value of the pixel points in the second block in the second to-be-spliced image corresponding to the first target block; and
calculating and obtaining a block gain of the first target block according to the total first pixel value and the total second pixel value.

2. The method according to claim 1, wherein the step of calculating output pixel values of the pixel points in the pixel grids in the first to-be-spliced image according to the pixel gains of the pixel points in the pixel grids in the first to-be-spliced image comprises steps of:
calculating pixel weights corresponding to the pixel points in the pixel grids in the first to-be-spliced image; and calculating and obtaining output pixel values of the pixel points in the first to-be-spliced image according to the pixel gains and the pixel weights of the pixel points in the pixel grids in the first to-be-spliced image.

3. The method according to claim 2, wherein the step of calculating pixel weights corresponding to the pixel points in the pixel grids in the first to-be-spliced image comprises a step of:
calculating, according to the sizes of pixel grids of the first to-be-spliced image, the pixel weights corresponding to pixel points with coordinates of the pixel points in the pixel grids of the first to-be-spliced image in the corresponding pixel grids.

4. The method according to claim 3, wherein the step of calculating pixel gains by using block gains of the first blocks corresponding to the pixel points comprises steps of:
calculating and obtaining the pixel gain comprising a designated number of pixel gain elements according to the pixel value of the pixel point and the designated number of block gains corresponding to the pixel point; and
the step of calculating pixel weights corresponding to the pixel points in the pixel grids in the first to-be-spliced image comprises a step of:
calculating, by using the size of the pixel grid according to the first to-be-spliced image and the coordinate of each pixel point in the pixel grid of the first to-be-spliced image, the pixel weight that comprises the designated number of weight elements and corresponds to the respective pixel point.

5. The method according to claim 3, wherein the step of calculating block gains of blocks in a first to-be-spliced image by using pixel values in first blocks in the first to-be-spliced image and pixel values of second blocks in a second to-be-spliced image comprises steps of:
calculating, when a first target block is a block of an overlapping area of the first to-be-spliced image and the second to-be-spliced image, a total first pixel value of the pixel points in the first target block;
calculating a total second pixel value of the pixel points in the second block in the second to-be-spliced image corresponding to the first target block; and
calculating and obtaining a block gain of the first target block according to the total first pixel value and the total second pixel value.

6. The method according to claim 2, wherein the step of calculating pixel gains by using block gains of the first blocks corresponding to the pixel points comprises steps of:
calculating and obtaining the pixel gain comprising a designated number of pixel gain elements according to the pixel value of the pixel point and the designated number of block gains corresponding to the pixel point; and
the step of calculating pixel weights corresponding to the pixel points in the pixel grids in the first to-be-spliced image comprises a step of:
calculating, by using the size of the pixel grid according to the first to-be-spliced image and the coordinate of each pixel point in the pixel grid of the first to-be-spliced image, the pixel weight that comprises the designated number of weight elements and corresponds to the respective pixel point.

7. The method according to claim 6, wherein the designated number is four, the pixel weight comprises four weight elements, and the step of calculating, by using the size of the pixel grid according to the first to-be-spliced image and the coordinate of each pixel point in the pixel grid of the first to-be-spliced image, the pixel weight that comprises the designated number of weight elements and corresponds to the respective pixel point comprises a step of:
calculating four weight elements in the pixel weight by using following formulas:

$$\text{weight\_tl} = (h-0.5-i)*(w-0.5-j)/(w*h);$$

$$\text{weight\_tr} = (0.5+i)*(w-0.5-j)/(w*h);$$

$$\text{weight\_bl} = (h-0.5-i)*(0.5+j)/(w*h); \text{ and}$$

$$\text{weight\_br} = (0.5+i)*(0.5+j)/(w*h);$$

herein, weight_tl, weight_tr, weight_bl and weight_br represent four weight elements in a pixel weight of a to-be-calculated pixel point; i represents the abscissa of the to-be-calculated pixel point in a corresponding pixel grid; j represents the ordinate of the to-be-calculated pixel point in a corresponding pixel grid; w represents a width of a pixel grid corresponding to the to-be-calculated pixel point; and h represents a height of a pixel grid corresponding to the to-be-calculated pixel point.

8. The method according to claim 7, wherein the step of calculating and obtaining the pixel gain comprising a designated number of pixel gain elements according to the pixel value of the pixel point and the designated number of block gains corresponding to the pixel point comprises a step of:
multiplying, for a target pixel point in a target pixel grid in the first to-be-spliced image, a target pixel value of the target pixel point by block gains of the first blocks comprising the target pixel point to obtain a target pixel gain of the target pixel point, wherein the target pixel gain comprises a designated number of pixel gain elements, and the designated number is a number of blocks comprising the target pixel grid.

9. The method according to claim 6, wherein the step of calculating and obtaining the pixel gain comprising a designated number of pixel gain elements according to the pixel value of the pixel point and the designated number of block gains corresponding to the pixel point comprises a step of:
multiplying, for a target pixel point in a target pixel grid in the first to-be-spliced image, a target pixel value of the target pixel point by block gains of the first blocks comprising the target pixel point to obtain a target pixel gain of the target pixel point, wherein the target pixel gain comprises a designated number of pixel gain elements, and the designated number is a number of blocks comprising the target pixel grid.

10. The method according to claim 2, wherein the step of calculating block gains of blocks in a first to-be-spliced image by using pixel values in first blocks in the first to-be-spliced image and pixel values of second blocks in a second to-be-spliced image comprises steps of:
calculating, when a first target block is a block of an overlapping area of the first to-be-spliced image and the second to-be-spliced image, a total first pixel value of the pixel points in the first target block;
calculating a total second pixel value of the pixel points in the second block in the second to-be-spliced image corresponding to the first target block; and
calculating and obtaining a block gain of the first target block according to the total first pixel value and the total second pixel value.

11. The method according to claim 1, wherein the step of calculating block gains of blocks in a first to-be-spliced image by using pixel values in first blocks in the first to-be-spliced image and pixel values of second blocks in a second to-be-spliced image comprises steps of:
  calculating, when a first designated block is a block of a partial overlapping area of the first to-be-spliced image and the second to-be-spliced image, a total first pixel value of the pixel points in the first designated block;
  calculating a total second pixel value of the pixel points in the second block in the second to-be-spliced image corresponding to the first designated block;
  calculating and obtaining an initial block gain of the first designated block according to the total first pixel value and the total second pixel value; and
  performing a weighted summation on the initial block gain and a designated numerical value to obtain a block gain of the first designated block.

12. An image splicing apparatus, comprising:
  a first calculation module, configured to calculate block gains of blocks in a first to-be-spliced image by using pixel values in first blocks in the first to-be-spliced image and pixel values of second blocks in a second to-be-spliced image, wherein the first to-be-spliced image comprises a plurality of the first blocks, and the second to-be-spliced image comprises a plurality of the second blocks;
  a second calculation module, configured to calculate, for pixel points in pixel grids in the first to-be-spliced image, pixel gains by using block gains of the first blocks corresponding to the pixel points, wherein each pixel grid comprises a plurality of the pixel points;
  a third calculation module, configured to calculate output pixel values of the pixel points in the pixel grids in the first to-be-spliced image according to the pixel gains of the pixel points in the pixel grids in the first to-be-spliced image; and
  a splicing module, configured to splice the first to-be-spliced image with the second to-be-spliced image according to the output pixel values of the pixel points of the first to-be-spliced image to obtain a spliced image;
  wherein the first calculation module is configured to:
  calculate, when a first target block is a block of an overlapping area of the first to-be-spliced image and the second to-be-spliced image, a total first pixel value of the pixel points in the first target block;
  calculate a total second pixel value of the pixel points in the second block in the second to-be-spliced image corresponding to the first target block; and
  calculate and obtain a block gain of the first target block according to the total first pixel value and the total second pixel value.

13. The image splicing apparatus according to claim 12, wherein the third calculation module comprises a weight calculation unit and a pixel calculation unit, wherein
  the weight calculation unit is configured to calculate pixel weights corresponding to the pixel points in the pixel grids in the first to-be-spliced image;
  the pixel calculation unit is configured to calculate and obtain output pixel values of the pixel points in the first to-be-spliced image according to the pixel gains and the pixel weights of the pixel points in the pixel grids in the first to-be-spliced image.

14. The image splicing apparatus according to claim 13, wherein the weight calculation unit is configured to:
  calculate, according to the sizes of pixel grids of the first to-be-spliced image, the pixel weights corresponding to the pixel points with coordinates of the pixel points in the pixel grids of the first to-be-spliced image in the corresponding pixel grids.

15. The image splicing apparatus according to claim 13, wherein the second calculation module is configured to calculate and obtain the pixel gain comprising a designated number of pixel gain elements according to the pixel value of the pixel point and the designated number of block gains corresponding to the pixel points; and
  the weight calculation unit is configured to calculate by using the size of the pixel grid according to the first to-be-spliced image and the coordinate of each pixel point in the pixel grid of the first to-be-spliced image, the pixel weight that comprises the designated number of weight elements and corresponds to the respective pixel point.

16. The image splicing apparatus according to claim 15, wherein the second calculation module is configured to:
  multiply, for a target pixel point in a target pixel grid in the first to-be-spliced image, a target pixel value of the target pixel point by block gains of the first blocks comprising the target pixel point to obtain a target pixel gain of the target pixel point, wherein the target pixel gain comprises a designated number of pixel gain elements, and the designated number is a number of blocks comprising the target pixel grid.

17. The image splicing apparatus according to claim 12, wherein the first calculation module is configured to:
  calculate, when a first designated block is a block of a partial overlapping area of the first to-be-spliced image and the second to-be-spliced image, a total first pixel value of the pixel points in the first designated block;
  calculate a total second pixel value of the pixel points in the second block in the second to-be-spliced image corresponding to the first designated block;
  calculate and obtain an initial block gain of the first designated block according to the total first pixel value and the total second pixel value; and
  perform a weighted summation on the initial block gain and a designated numerical value to obtain a block gain of the first designated block.

18. An electronic device, comprising a processor and a memory, wherein the memory has machine-readable instructions stored thereon and executable by the processor, wherein when the electronic device is running, the machine-readable instructions, when executed by the processor, perform steps of the method according to any one of claims 1-9 and 11.

* * * * *